(12) United States Patent
Shand et al.

(10) Patent No.: US 7,042,838 B1
(45) Date of Patent: May 9, 2006

(54) METHOD AND APPARATUS FOR FORWARDING DATA IN A DATA COMMUNICATIONS NETWORK

(75) Inventors: Ian Michael Charles Shand, Cobham (GB); Stewart Frederick Bryant, Redhill (GB); Clarence Filsfils, Brussels (BE); Kevin George Miles, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/848,669

(22) Filed: May 18, 2004

(51) Int. Cl.
*G01R 31/08* (2006.01)
(52) U.S. Cl. ...................... 370/225; 370/221
(58) Field of Classification Search .............. 370/216, 370/218, 225, 221, 228, 238, 237, 234, 235, 370/387
See application file for complete search history.

(56) References Cited

U.S. PATENT DOCUMENTS

| | | | |
|---|---|---|---|
| 5,243,592 A | | 9/1993 | Perlman et al. |
| 5,253,248 A | * | 10/1993 | Dravida et al. ............. 370/228 |
| 5,999,286 A | * | 12/1999 | Venkatesan .................... 398/5 |
| 6,148,410 A | * | 11/2000 | Baskey et al. ................. 714/4 |
| 6,243,754 B1 | * | 6/2001 | Guerin et al. ............... 709/227 |
| 6,347,078 B1 | | 2/2002 | Narvaez-Guarnieri et al. |
| 6,389,764 B1 | * | 5/2002 | Stubler et al. ............. 52/220.8 |
| 6,535,481 B1 | * | 3/2003 | Andersson et al. ......... 370/225 |
| 6,668,282 B1 | * | 12/2003 | Booth et al. ................ 709/224 |
| 6,829,215 B1 | * | 12/2004 | Tornar ........................ 370/223 |
| 2002/0093954 A1 | * | 7/2002 | Weil et al. .................. 370/389 |
| 2004/0117251 A1 | | 6/2004 | Shand |

OTHER PUBLICATIONS

International Searching Authority, International Search Report, PCT/US04/33827, dated Mar. 28, 2005, 8 pages.
Current Claims, PCT/US04/33827, 6 pages.
Wang, et al., "Shortest Path First with Emergency Exits," ACM, 1990, 11 pages.

* cited by examiner

*Primary Examiner*—Ajit Patel
*Assistant Examiner*—Steven Blount
(74) *Attorney, Agent, or Firm*—Hickman Palermo; Truong & Becker, LLP

(57) ABSTRACT

A method of forwarding data in a data communications network comprising a plurality of nodes comprises the step of forwarding data according to a forwarding strategy implemented at a forwarding node. Where the implemented strategy comprises a repair strategy to compensate for a change in the network, the method further comprises the step of encapsulating the data in a primary repair encapsulating packet and marking the primary repairing encapsulating packet as repaired.

33 Claims, 8 Drawing Sheets

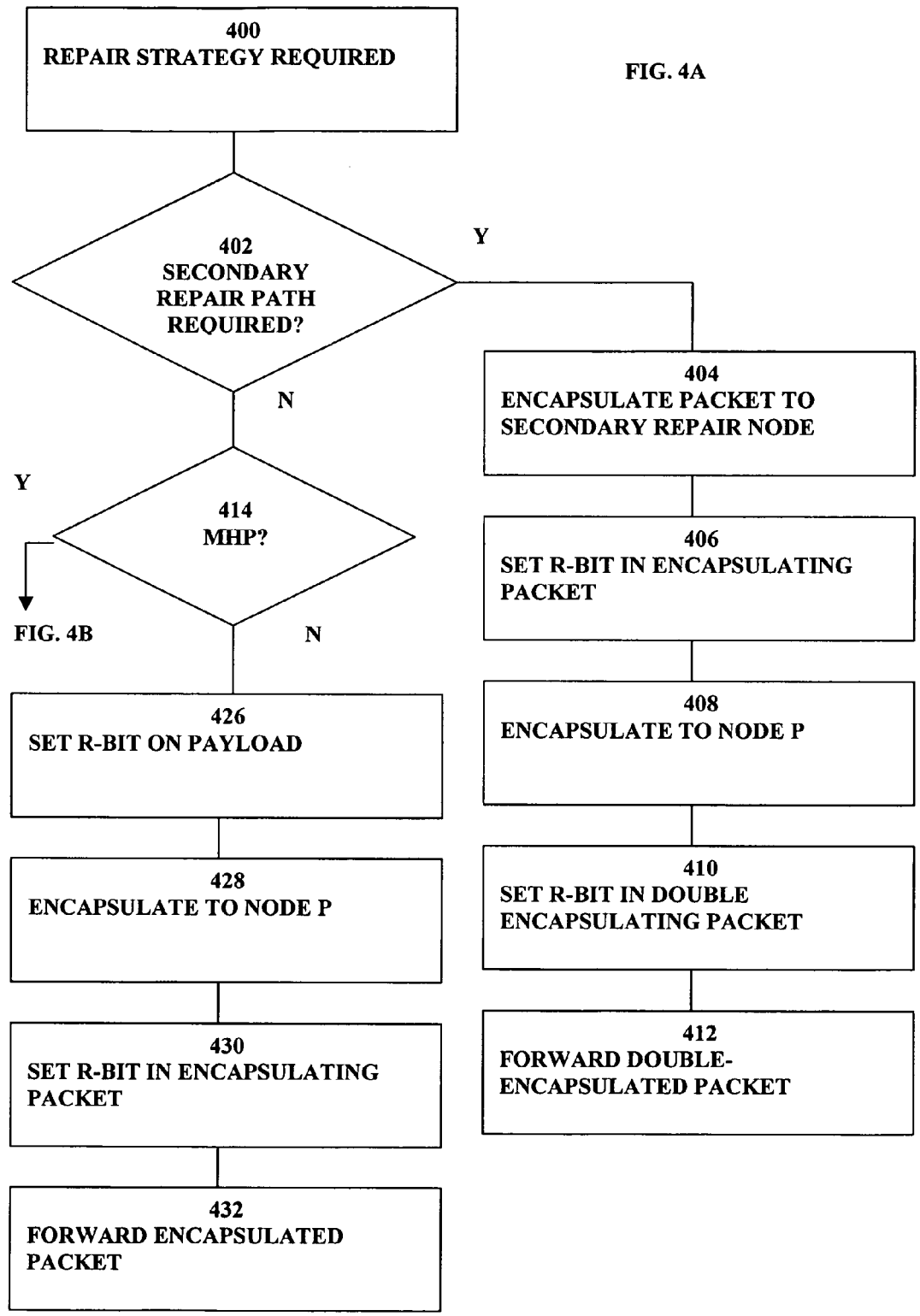

| 602 | 604 |
|---|---|
| REPAIR TUNNEL HEADER | PAYLOAD |
| R-BIT SET | R-BIT SET |

FIG. 6A

| 606 | 608 | 610 |
|---|---|---|
| REPAIR TUNNEL HEADER | SECONDARY REPAIR TUNNEL HEADER | PAYLOAD |
| R-BIT SET | R-BIT SET | R-BIT NOT SET |

FIG. 6B

| 612 | 614 | 616 | 618 |
|---|---|---|---|
| REPAIR TUNNEL HEADER | SECONDARY REPAIR TUNNEL HEADER | MULTI HOMED PREFIX REPAIR TUNNEL HEADER | PAYLOAD |
| R-BIT SET | R-BIT SET | R-BIT NOT SET | R-BIT NOT SET |

FIG. 6C

| 620 | 622 | 624 |
|---|---|---|
| REPAIR TUNNEL HEADER | MULTI HOMED PREFIX REPAIR TUNNEL HEADER | PAYLOAD |
| R-BIT SET | R-BIT SET | R-BIT NOT SET |

FIG. 6D

METHOD AND APPARATUS FOR FORWARDING DATA IN A DATA COMMUNICATIONS NETWORK

FIELD OF THE INVENTION

The present invention generally relates to forwarding data in a network. The invention relates more specifically to a method and apparatus for forwarding data in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately. When there is a network change an LSP representing the change is flooded through the network, each node sending it to each adjacent node.

As a result, when a data packet for a destination node arrives at a node (the "first node"), the first node identifies the optimum route to that destination and forwards the packet to the next node along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

In some circumstances it is desirable to have more control over the route that a packet takes in which case "tunneling" can be used. According to this scheme if a node A receives a packet destined for node Z and for some reason it is desired that the packet should travel via node Y, under normal circumstances node A would have no control over this (unless Y was an adjacent node), as the route is dependent on the forwarding table generated as a result of the SPF at node A and any intermediate nodes as well. However node A can "tunnel" the packet to node Y by encapsulating the received packet within a packet having destination node Y and sending it to node Y which acts as the tunnel end point. When the packet is received at node Y it is decapsulated and Y then forwards the original packet to node Z according to its standard forwarding table. Yet further control is available using directed forwarding in which the encapsulated packet includes a specific instruction as to which neighboring node of the end point of the tunnel the encapsulated packet should be sent, which comprises the "release point". One well-known type of tunneling is Internet Protocol (IP) tunneling, in which the outer L3 header is an IP header, and the payload that it carries is an IP payload. Examples of such tunneling include Generic Routing Encapsulation (GRE) and IP/IP tunneling.

Where a component such as a link or node fails on a network it is desirable to repair the failure for example by routing data packets around the failed component. Zhang Yang and Jon Crowcroft in the paper "Shortest Path First with Emergency Exits" ACM SIGCOMM Computer Communication Review Volume 209, Issue 4 (September 1990) propose a solution according to which, for a given destination node an alternative path (AP) is created to the shortest path (SP) for a specified node to the destination using a downstream path (i.e. a path which will get a packet closer to its destination than the current node) identified by calculating whether any of the specified node's neighbor nodes can reach the destination without looping back to the specified node. If, for any destination in the network, an AP is not available, then the specified node sends a message to each of its neighbors to assess whether any of their neighbors can provide a downstream path to the destination. If not then the message is propagated out once again until an "exit" to the destination node is identified, providing a "reverse alternative path" (RAP). The specified node maintains a table, for every destination, of the SP and AP and, where an AP is not available an RAP.

Various problems arise with this approach. First of all because it relies on a signaling protocol in order to establish whether an RAP is available, the process is time- and bandwidth-consuming. Furthermore in order to forward a packet to an exit in an RAP the source has to force it upstream, potentially over a number of hops which requires source routing. As a result an additional protocol is overlaid on the link state protocol and the processing burden of the specified node is also increased.

Another such system is described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. According to the solution put forward in Miles et al where a repairing node detects failure of an adjacent component, then the repairing node computes a first set of nodes comprising the set of all nodes reachable according to its protocol other than nodes reachable by traversing the failed component. The repairing node then computes a second set of nodes comprising the set of all nodes from which a target node is reachable without traversing the failed component. The method then determines whether any intermediate nodes exist in the intersection between the first and second sets of nodes or a one-hop extension thereof and tunnels packets for the target node to a tunnel end point comprising a node in the intersection of the first and second sets of nodes. An extension of the approach is described in co-pending patent application Ser. No. 10/442,589, filed 20 May 2003, entitled "Method and Apparatus for Constructing a Transition Route in a Data Communications Network" of Stewart F. Bryant et al., (Bryant et al) the entire contents of which are incorporated by reference for all purposes as if fully set forth herein, and in which the approach is extended to cover repairs for non-adjacent nodes.

Whilst such systems provide rapid network recovery in the event of a failed component, in some instances where multiple or all nodes in a network support the repair strategy, loops can occur. One such instance is where two concurrent unrelated failures take place in the network. In that case a first repairing node adjacent the first failed component will institute its own first repair strategy and forward a packet according to that strategy, relying on the remaining nodes in the repair path using their normal forwarding. If, however, the packet traverses a second repairing node independently repairing around a second failed component, a loop may occur. In particular the second repairing node will have instituted its own second repair strategy differing from normal forwarding and accordingly may return packets from the first repairing node back towards the first repairing node, giving rise to a loop. It will be apparent that such a problem can also arise in the transition route approach described above in Bryant et al and indeed in any case where a repair strategy is distributed across multiple nodes in a network.

In some instances the repair strategies of different nodes may be incompatible, giving rise to loops. This can occur where potential repair paths from a repairing node to a target neighbor node include another neighbor node to the failed component. In that case, traffic repaired to the other neighbor node may loop back towards the repairing node in some instances.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6A is a representation of a packet for forwarding according to the method;

FIG. 6B is a representation of an alternative packet for forwarding according to the method;

FIG. 6C is a representation of a further packet for forwarding according to the method;

FIG. 6D is a representation of a further packet for forwarding according to the method;

DETAILED DESCRIPTION OF THE PREFERRED EMBODIMENT

A method and apparatus for forwarding data in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and Apparatus for Forwarding Data
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for forwarding data in a data communications network comprising a plurality of nodes. The method comprises the steps, performed at a forwarding node, of implementing a forwarding strategy and forwarding data according to the forwarding strategy. Where the implemented strategy comprises a repair strategy to compensate for a change in the network, the method further comprises the step of encapsulating the data in a primary repair encapsulating packet and marking the primary repairing packet as repaired.

In other aspects, the invention encompasses a computer apparatus and a computer-readable medium configured to carry out the foregoing steps.

2.0 Structural and Functional Overview

Figure 1:
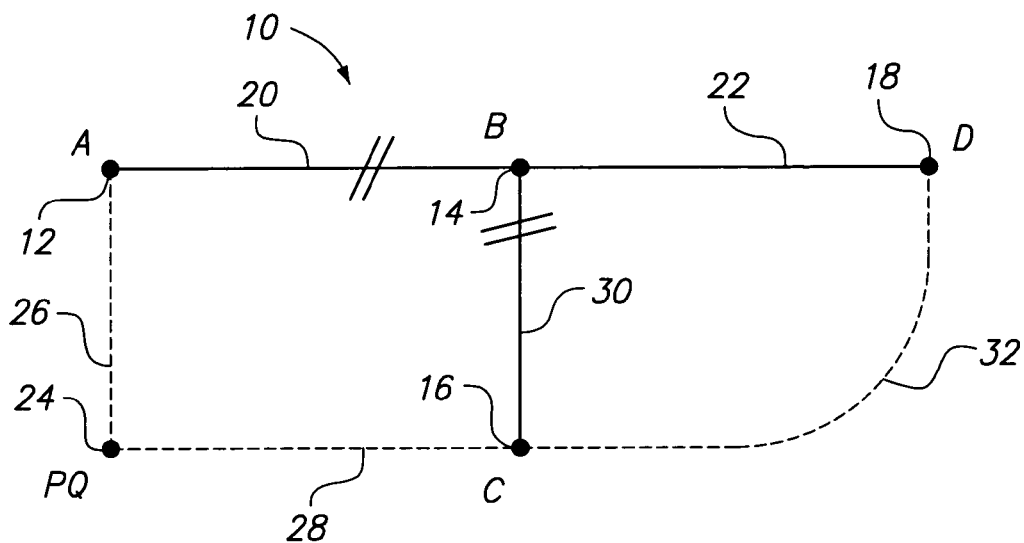
FIG. 1 is a representation of a network that illustrates a method for forwarding data.

In overview a method for forwarding data can be understood with reference to FIG. 1 which depicts an illustrative network diagram to which the method is applied. The network is designated generally 10 and includes node A reference numeral 12, node B reference numeral 14, node C, reference numeral 16 and node D, reference numeral 18. Node B is joined to node A via link 20 and to node D via link 22. In the case of normal routing node A will forward packets to node D via node B. However referring to FIG. 1, link 20 between nodes A and B has failed. As a result node A constructs a repair path to node D via node C. The repair path is constructed in accordance with the approach described above with reference to Miles et al. In particular node A tunnels data to a tunnel end point PQ reference numeral 24 along a path which may include multiple nodes and designated here 26. Although the end point is designated here as node PQ it will be appreciated that in practice it can comprise a tunnel end point at node P from which a decapsulated packet is source routed to an adjacent node Q for example by directed forwarding as discussed in more detail in Miles et al. Node Q is a member of the second set of nodes from which the target node is reachable without traversing the failed component such that the packet, having reached node Q, is then forwarded towards node D via a path 28 joining node PQ to node C and generally designated 28. Path 28 may again comprise multiple nodes and links. Node C will then route the data along link 30 to node B and the data is then forwarded along the link 22 to node D.

However a problem can arise with this approach, for example, in the case of an additional unrelated failure. In particular it can be seen in the instance shown in FIG. 1 that link 30 has also failed between nodes C and B. In this case node C, having detected the failure, will implement its own repair strategy to forward packets to node D. In the topology shown in FIG. 1 a first alternative route from node C to node D is via path 32 which may comprise multiple nodes and links. However in some instances the only, or lowest cost repair strategy may require node C to forward or tunnel packets via node A, bearing in mind that node C may not be aware of the failure of link 20. It will be seen that in those circumstances a loop may arise between nodes A and C which, implementing their respective repair strategies, forward the packets back and forth along the path 26, 28.

Figure 2:
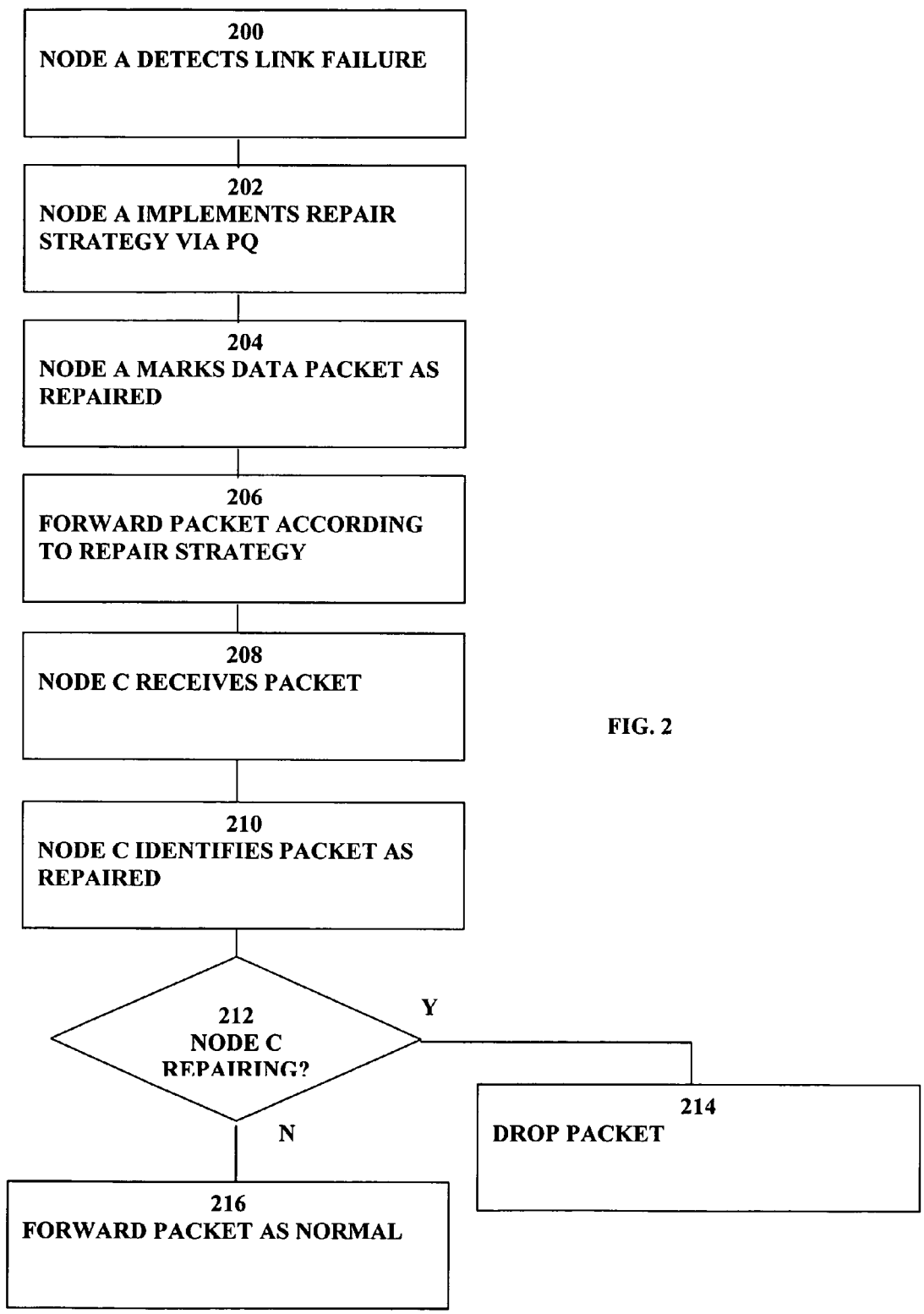
FIG. 2 is a flow diagram illustrating a high level view of a method for forwarding data.

FIG. 2 is a flow diagram illustrating a high level view of a method of forwarding data which addresses these problems. In block 200 node A detects the failure of link 20. In block 202 node A implements a repair strategy via PQ. In block 204 node A marks the data packet being forwarded according to the repair strategy as having been repaired. In block 206 the packet is forwarded according to the repair strategy. In block 208 node C receives the packet. As discussed above, in normal circumstances with link 30 down node C would implement its own repair strategy which could give rise to loops. However according to the method described herein, at block 210 node C identifies that the packet has already been repaired, i.e. is being forwarded according to node A's repair strategy. In block 212 node C establishes whether it is implementing its own repair strategy. If it is then in block 214 node C drops the packet rather than potentially looping it back to node A. Otherwise in block 216 node C forwards the packet as normal.

As a result potential loops are avoided in the case of multiple concurrent failures. It will be seen that in a similar way if in fact node B has failed rather than individual links 18 and 30 then if nodes A and C are independently configured to institute repair strategies, potential loops will again be avoided.

Figure 3:
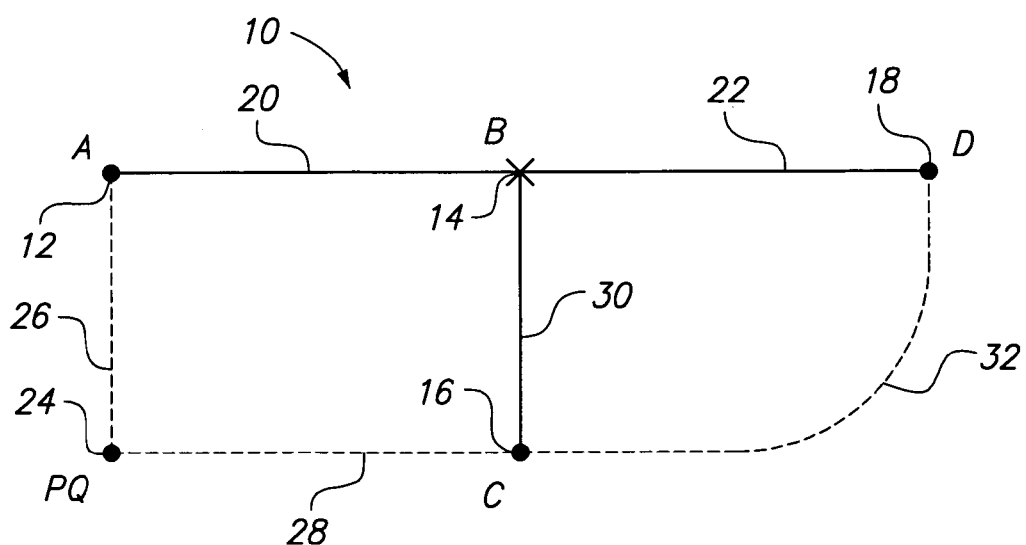
FIG. 3 is a representation of a network that illustrates a method for forwarding data according to an optimization.

The method described herein can be further understood with reference to FIG. 3 which depicts an illustrative network diagram similar to that of FIG. 1 but where node B has failed. In some instances, because of the network topology, node A may not be able to construct a repair strategy to node D. For example node A may not be able to identify an appropriate intermediate node which can be used to forward packets to node D in the case of interference from node C which is also a neighbor of node B. In those instances node A may elect to implement a secondary repair strategy.

According to the secondary repair strategy node A, the primary repairing node will forward packets with target node D as far as node C and then rely on node C as a secondary repairing node to instigate its own repair path for the packets such that they can reach target node D. Node A identifies secondary repairing nodes by computing the SPTs for neighbor nodes to node B and identifying those neighbor nodes which themselves have a repair path for the target node and to which node A has a repair path. In order to avoid the risk of loops arising between the primary repairing node (node A) and any nodes between the decapsulation point in the primary repair path and the secondary repairing node (node C), in an optimization node A encapsulates the packet to node C and then applies the primary repair strategy to the encapsulated packet.

Accordingly the tunneled packet is then forwarded to node C according to the primary repair strategy, for example by encapsulating it again to an intermediate node P from which the tunneled packet is forwarded to node C as discussed in Miles et al. In normal operation, node C would decapsulate the tunneled packet, identify that its destination was node D and instigate its own repair strategy to send the packet to node D, repairing around failed node B. However if node A has marked the packet as repaired and node C implements the method described above, the packet will be dropped even though the secondary repair path will have been designed to avoid the possibility of loops. According to the method, therefore the encapsulated packet to D, or "payload" is not marked as repaired and instead the encapsulating packet is marked as repaired for example in the tunnel header. As a result nodes on the repair path between intermediate node A and node C will not attempt to instigate a separate repair of the encapsulated packet, as they will see it marked repaired. However once node C has decapsulated the packet and retrieved the payload, as this is not marked as repaired, node C will carry out the secondary repair as intended. Thus a method is provided which is applicable to repair strategies using tunneling and encapsulation.

3.0 Method and Apparatus for Forwarding Data

For purposes of illustrating a clear example, the method described herein in some instances refers to implementation of a repair path of the type described in Miles et al. However the method described herein is not limited to the context of Miles et al and any appropriate repair mechanism may be adopted.

The method described herein can be implemented according to any appropriate routing protocol. Generally, link state protocols such as Intermediate System to Intermediate System (IS—IS) or Open Shortest Path First (OSPF) are appropriate protocols. Link state protocols of this type are well understood by the skilled reader and well documented in pre-existing documentation, and therefore are not described in detail here.

Figures 4A, 4B:
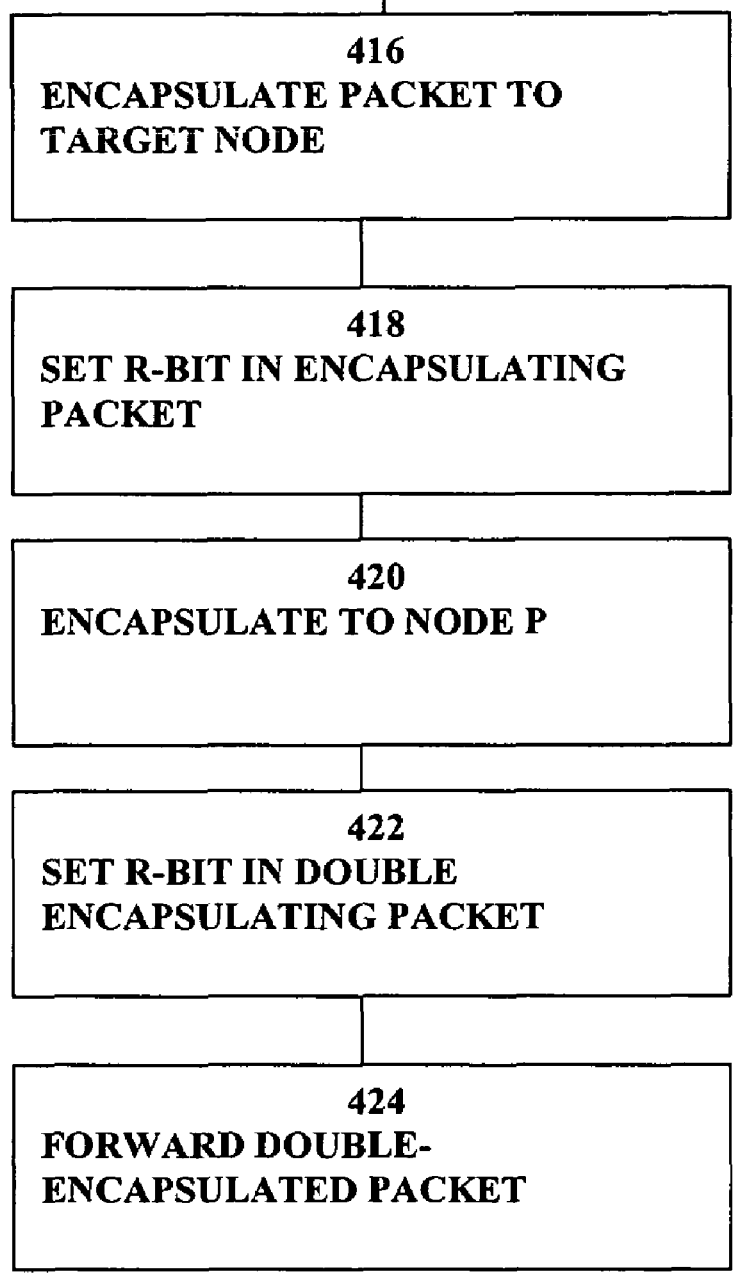
FIG. 4A is a flow diagram illustrating in more detail steps involved in forwarding data.
FIG. 4B is a flow diagram illustrating in more detail steps involved in forwarding data.

The method can be understood with reference to FIG. 3 and to FIG. 4A which is a flow diagram illustrating in more detail the method described herein. In particular, in the network example of FIG. 3, in block 400 of FIG. 4A node A identifies that a repair strategy is required for example upon detection of failure of node B. As discussed in more detail in Miles et al even though node A may not be able to distinguish whether it is node B that has failed or whether it is link 20, it may assume failure of node B on a "worst case scenario" basis.

In block 402 node A determines whether a secondary repair is required. This can be done in any appropriate manner. For example node A can identify that a repair path is not available to the destination node. In that case it can calculate potential repair paths from nodes which it can reach to the destination node. This is easily achieved because all nodes show a common LSDB. If such a node is available then this can form the basis of a secondary repair path. If a secondary repair path is required, where node C will be carrying out the secondary repair, then in block 404 at node A the packet is encapsulated in a packet with destination node C (the secondary repair node).

In block 406 the encapsulating packet is marked as having been repaired. This can be done in any appropriate manner for example by setting a bit termed here the R-bit in an appropriate field in the header of the encapsulating packet. For example the R-bit can be set in the DSCP (Differentiated Services Code Point) field in the IP header in the encapsulating packet. Of course any appropriate marker can be used associated with the packet for example using the address space. In block 408 the primary repair strategy is then applied to the encapsulating packet. In particular the already-encapsulated packet is encapsulated again to be tunneled to an intermediate node, node P. In block 410 the R-bit is also set in the further or double-encapsulating packet and in block 412 the double-encapsulated packet is forwarded.

As a result, as discussed in Miles et al the double-encapsulated packet will be tunneled to node P which has been identified as an appropriate intermediate node for the repair strategy. At node P the outer layer of encapsulation is removed and the packet is forwarded normally to node C (to which the ultimate payload is being tunneled within the first layer of encapsulation). Node C then receives the packet and strips the inner layer of encapsulation to reveal the payload which will be forwarded to its ultimate destination as discussed in more detail below.

The approach described allows various contingencies to be dealt with in the normal manner. For example if, in block 402, no requirement is identified for secondary repair then in block 414 node A establishes whether the eventual destination of the packet is a multi-homed prefix (MHP).

As will be known to the skilled reader, in some instances rather than a prefix or address belonging for example to different autonomous system or mission critical service being "attached" to exactly one node in a network, in many cases the same prefix will be attached to two or more nodes which may not be adjacent for example to provide resilience in the event of the failure of one of the nodes. A problem can arise where one instance of the prefix is reachable only via a failed node, in which case other nodes in the repair path, which are not yet aware of any failure, may identify a shortest path to the prefix which is via the failed node. This will cause the traffic to loop. One possible solution is to treat the prefix itself as the target but this can give rise to an unacceptably large computational overhead in the case of a large number of multi-homed prefixes. In an optimization, therefore, a solution is to tunnel the traffic for a multi-homed prefix to a node to which it is attached other than the failed component. However where a repair strategy is applied it will be recognized that care must be taken in setting a R-bit on such a packet as described below.

If a multi-homed prefix does occur then node A carries out the steps described with reference to FIG. 4B which is a flow diagram illustrating in more detail a method of forwarding data. In block 416 node A encapsulates the payload packet to the multi-homed prefix target node i.e. the instance not attached to node B. In block 418 node A sets the R-bit in the inner encapsulating packet. In block 420 node A further encapsulates the packet to node P. In block 422 the R-bit is also set in the double-encapsulating packet and in block 424 the double encapsulated packet is forwarded by node A.

Reverting to FIG. 4A, if, in block 414 no multi-homed prefix requirement is identified then in block 426 node A sets the R-bit on the payload, encapsulates the payload in a tunnel to node P in block 428 and sets the R-bit on the encapsulating packet in block 430. In block 432 node A then forwards the encapsulated packet. It will be appreciated that if secondary repair is instigated in block 402 then a multi-homed prefix strategy of the type described above can also be implemented similarly.

It will be appreciated that the order of the steps set out above can be varied as appropriate. In addition the repair strategy may differ in some instances. For example encapsulation to node P may not be required where there is a downstream path.

Although the above discussion is presented with reference to a secondary repair strategy because of interference in which the secondary repairing node, node C, is a neighbor to the failed node, node B, it will be appreciated that alternatively the primary repairing node, node A, could repair to a secondary repair node that was not a neighbor to the failed node. This can be a benefit, for example, in the case of a "shared risk group" that is where the network contains additional information concerning correlated network components that will suffer a concurrent failure. An example of this, for example, is knowledge that multiple links which are topologically discrete are in fact commonly physically ducted such that duct failure would affect all of them.

As an additional optimization a counter may be added to a repaired packet in place of an R-bit. The counter can be set to any desired value and then decremented at each node which attempts to institute an independent repair. In each case the independent repair is then implemented, i.e. the counter is not treated as though the R-bit were set. Once the counter has been decremented to a pre-determined value, however, the packet is treated as though the R-bit is set, as discussed above. Accordingly a node attempting to implement independent repair on such a packet will discard the packet. As a result the packet is allowed potentially to loop through a number of cycles determined by the initial counter setting as each independent repair is implemented, before being discarded. This can be advantageous, for example, in the case of secondary repair to a non-neighbor node of the failed node in which case the likelihood of unrelated component failures in the repair path potentially increases, but the risk of looping as a result of such unrelated failures can decrease. The counter number is optimally set to a low number such as two or three such that only a small amount of looping is tolerated in the worst-case scenario. Alternatively, the counter can be an incremental counter and the packet discarded once the counter has reached a predetermined value and generally the method extends to any counter having an adjustable counter value and a predetermined suppress value.

Figure 5:
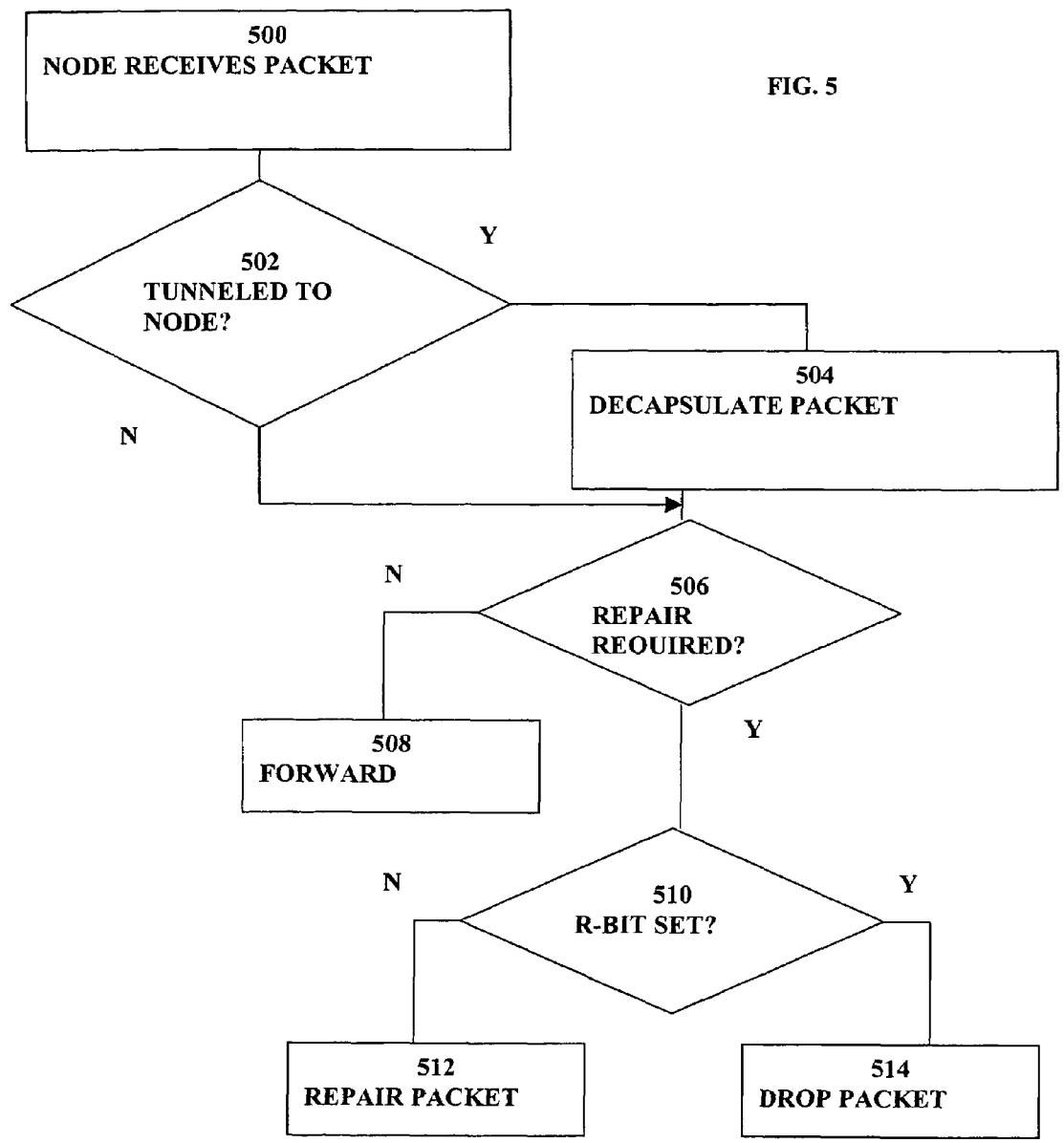
FIG. 5 is a flow diagram illustrating the steps taken at a node receiving forwarded data according to the method.

The manner in which the marked packets are handled at subsequent nodes can be understood with reference to FIG. 5 which is a flow diagram illustrating in more detail the method of forwarding data. In overview, as discussed above, those nodes which receive the data packet and identify that the R-bit is set will forward the packet as normal or drop it if they are attempting their own repair. Each node will "see" the R-bit only if it is in the relevant layer of encapsulation, that is, the outer layer at the point the forwarding decision is made. For example a node between node A and the intermediate node P will detect any R-bit in the header of the encapsulating packet tunneling the data to node P. A node between node P and the secondary repairing node C will see the R-bit set in the inner encapsulating packet tunneling the payload to node C and so forth. Node C itself will strip the inner encapsulation revealing the payload itself which, as discussed above, will not have the R-bit set in the case of a secondary repair. As a result node C will instigate its own repair on the payload.

Accordingly in block 500 a node receives a data packet which may be the bare payload or a single or double encapsulated payload. In block 502 the node establishes whether the packet has been tunneled to it. If the packet has been tunneled to the receiving node then in step 504 the receiving node decapsulates the packet and in block 506 establishes whether a repair is required. If no repair is required then the decapsulated packet (which may itself be a tunneled packet) is forwarded as normal in block 508. If repair is required then at block 510 the receiving node establishes in block 510 whether the R-bit has been set in the decapsulated packet, that is, the packet to be forwarded. If the R-bit is not set then in block 512 the receiving node repairs the decapsulated packet, i.e. sends it along the secondary repair path. If the R-bit is set then in block 514 the receiving node drops the packet rather than risking causing a loop.

Reverting to block 502, if the receiving node establishes that the packet has not been tunneled to it then it deals with it as any other packet and the routine proceeds to block 506 described above.

As a result it will be seen that the repair strategy adopted is based on whether an R-bit is set on the outgoing payload from the node whether that payload be the original data packet or an encapsulated packet.

It will be appreciated that a consistent repair regime will generally be set up within a specific domain for example an asynchronous domain is, in an optimization, such that the R-bit reset at the border of the domain.

As discussed above the approach described herein provides yet greater flexibility in developing a repair strategy for a network. Setting the R-bit on the encapsulation and ensuring that the R-bit is only set at the relevant layer of encapsulation avoids problems that could arise with alternative approaches such as setting a rule that the R-bit is discounted by a node that has carried out a decapsulation, as this would still not deal with the secondary repair issue. It is also an improvement to the alternative of only setting the R-bit on packets addressed to node B and forcing a packet to node B from node A as soon as node A detected a failure.

It will be noted, referring to the network shown in FIG. 3, that if node C continues to drop packets having the R-bit set rather than repairing them then node A will continue to run its repair strategy which may involve holding off convergence until the failure is cured. Accordingly it is beneficial for node A to become aware that node C is dropping the packets in that instance. Accordingly in an optimization node C notifies node A of the problem either in the form of an explicit message, or returning or tunneling the packet back to node A or by signaling an appropriate message through the routing protocol.

Setting of the R-bit can be further understood with reference to FIGS. 6A to 6D which shows schematically a packet encapsulation and marking scheme. In each case the packet has been repaired, that is, it has been placed in a tunnel and hence comprises a repair tunnel header and a payload. In the case of FIG. 6A where a simple repair is carried out (see blocks 426 to 432 of FIG. 4A) then the R-bit is set in the repair tunnel header 602 and the payload 604. Referring to FIG. 6B, where secondary repair is taken out (see FIG. 4A, blocks 404 to 412) then the R-bit is set in the repair tunnel header 606 and the secondary repair tunnel header 608 but not in the payload 610. Referring to FIG. 6C where secondary repair is taken out on a multi-homed prefix repair then the R-bit is set in the repair tunnel header 612 and the secondary repair tunnel header 614 encapsulated therein, but not in the multi-homed prefix repair tunnel header 616 nor the payload 618. Referring to FIG. 6D, where secondary repair is not carried out but multi-homed prefix repair is carried out (see FIG. 4B, blocks 416 to 424) then the R-bit is set in the repair tunnel header and the multi-homed prefix repair tunnel header 620, 622 respectively but not in the payload 624. In other words it can be seen that in all cases the R-bit is set in the primary repair tunnel header and at the next level of encapsulation. In the case where tunneling is not required for primary repair, for example in the case where node PQ would be the next hop from the repairing node in normal routing, a similar scheme will be adopted for that shown in FIGS. 6A to 6D but without the respective primary repair tunnel headers 602, 606, 612, 620.

Figure 7:
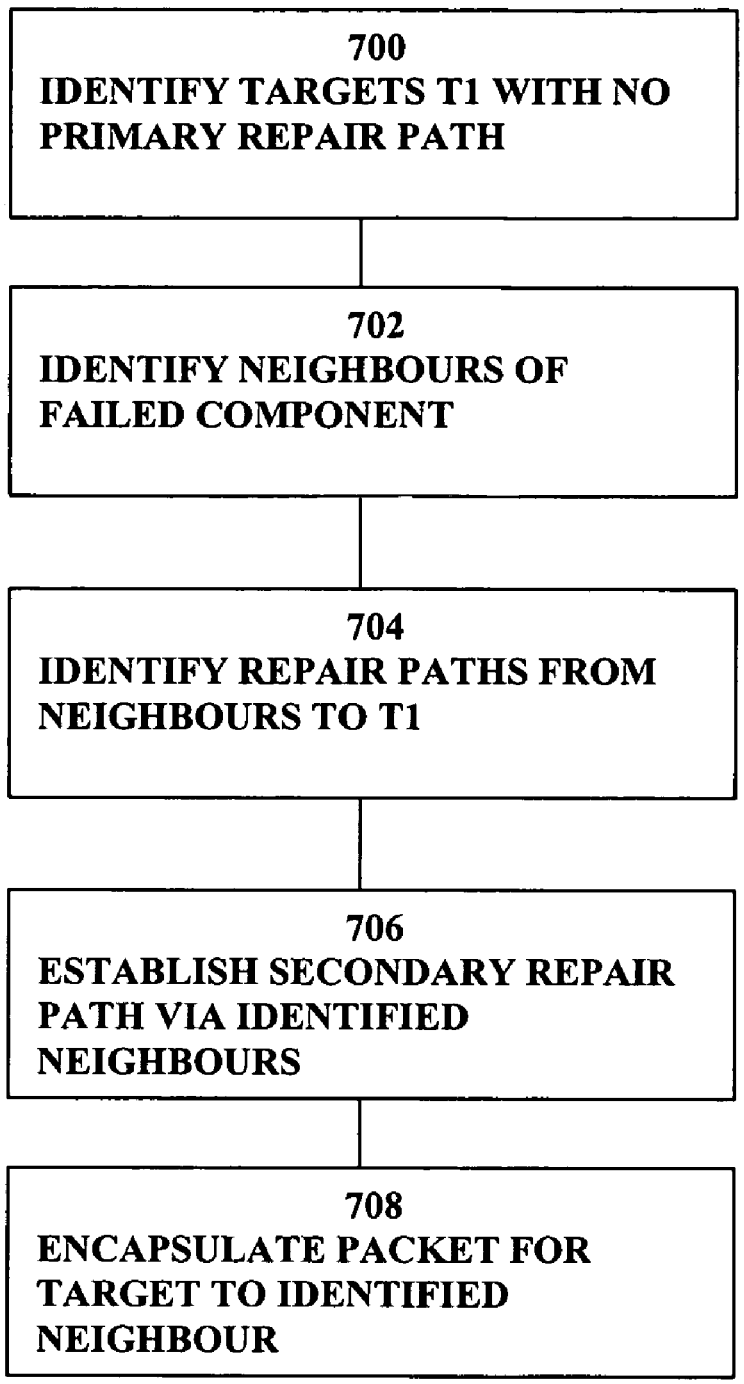
FIG. 7 is a flow diagram illustrating the steps involved in establishing a secondary repair path.

Referring to block 402 in FIG. 3, the manner in which secondary repair is implemented is described further with reference to FIG. 7 which is a flow diagram illustrating in more detail a method of identifying a secondary repair path. As discussed above, secondary repair paths are needed, for example, in the case of interference as can be understood with reference to FIG. 3. In this case where node A is attempting to repair packets to target node D following failure of node B, the existence of other neighbors to the failed node may preclude a repair path to one or more target nodes. For example this might be the case because node A will calculate that node D is not reachable from node C because all paths via node B have been excised in the approach according to Miles et al. However a secondary repair path strategy can be implemented whereby node A as a primary repairing node repairs packets to node D along the primary repair path to node C via node (or nodes) PQ. Node C will then institute its own repair path as a secondary repairing node which will forward the packet to node D. As discussed above, if node A were simply to forward the packet with destination node D according to the primary repair strategy, then upon decapsulation at node PQ any node along the path 28 between nodes PQ and node C might identify an alternative potentially looping shortest path to node D. As a result in an optimization packets are tunneled to node C and the primary repair strategy at node A is applied to the encapsulated packet.

In any event node A must identify possible secondary repairing nodes. Various approaches are possible. In one approach, upon component failure, each node can advertise in its own LSP using an appropriate field such as a TLV (Type-Length-Value) field the set of neighbors to which it can establish repair paths. As a result the primary repairing node, node A can then determine whether a secondary repair path is available via one of the advertising nodes to which node A can itself institute a primary repair path. In an optimization the primary repairing node could run an SPF using only the additional reachability information in the new TLVs. If it is not possible to reach all nodes then the attempt at repair must be abandoned.

In another approach shown in FIG. 7, node A, the primary repairing node, identifies potential secondary repairing nodes via which it can institute a secondary repair path. In general each node can independently compute a repair path for the other neighbors of the failed component by running the repair path computation algorithms (SPFs) routed at each of those neighbors. However in an optimization, at step 700 the repairing node calculates its primary repair path and identifies any targets to which a primary repair path cannot be established defined as the set $T_1$. In block 702 the primary repairing node identifies all neighbors to the failed component. In block 704 the primary repairing node calculate whether repair paths are available from any of the neighbors to a target node in the set $T_1$. In block 706 the primary repair node establishes a secondary repair path via any neighbors identified in block 704 which act as secondary repairing nodes. In block 708 upon receipt of a packet for the respective node in set $T_1$ the primary repairing node encapsulates the packet in an encapsulating packet destined for the relevant secondary repairing node and sends it along the primary repair path destined for the secondary repairing node.

Again, in the event that it is not possible to reach all nodes then the attempt at repair may be abandoned.

Although the discussion above is directed to neighbor nodes and in particular secondary repair paths aimed at overcoming interference problems it will be appreciated that alternatively or in addition the approach can also be directed to instituting secondary repair paths via non-neighboring nodes. As discussed above one possible implementation here is in relation to shared risk groups as the primary repairing node will have all the information required concerning the changed topology of the network in order to compute secondary repair paths. It will be further appreciated that an equivalent approach can be applied to tertiary and even higher number repair paths as long as multiple encapsulations are tolerated by the network or routing protocol.

It will be seen that various advantages are attached to the method described herein. In particular the potential for looping is generally avoided where resulting from conflicting repair paths whilst predetermined secondary repair paths or multi-homed prefix repair strategies are accommodated.

The mechanisms by which the methods and optimizations discussed above are implemented will be well known to the skilled reader and do not require detailed discussion here. For example the additional code required to implement the method such as setting the R-bit, detecting the R-bit and implementing appropriate strategies dependent on the status of the R-bit will be apparent to the skilled reader, for example as a simple modification of the existing code. It will be appreciated that the method can be applied according to any appropriate link state protocol. In some instances the approach may not be required, for example where a normal routing path such as an equal cost, alternative path is available.

The method can be implemented in hardware or software and using for example micro-code. The packet can be marked in any appropriate way for example any appropriate part of the packet or packet header or options may be used for example the address space or the DSCP field. The method can be applied, in addition to secondary repairs and multi-homed prefix repairs, to any other appropriate planned repair strategy overriding normal routing.

4.0 Implementation Mechanisms—Hardware Overview

Figure 8:
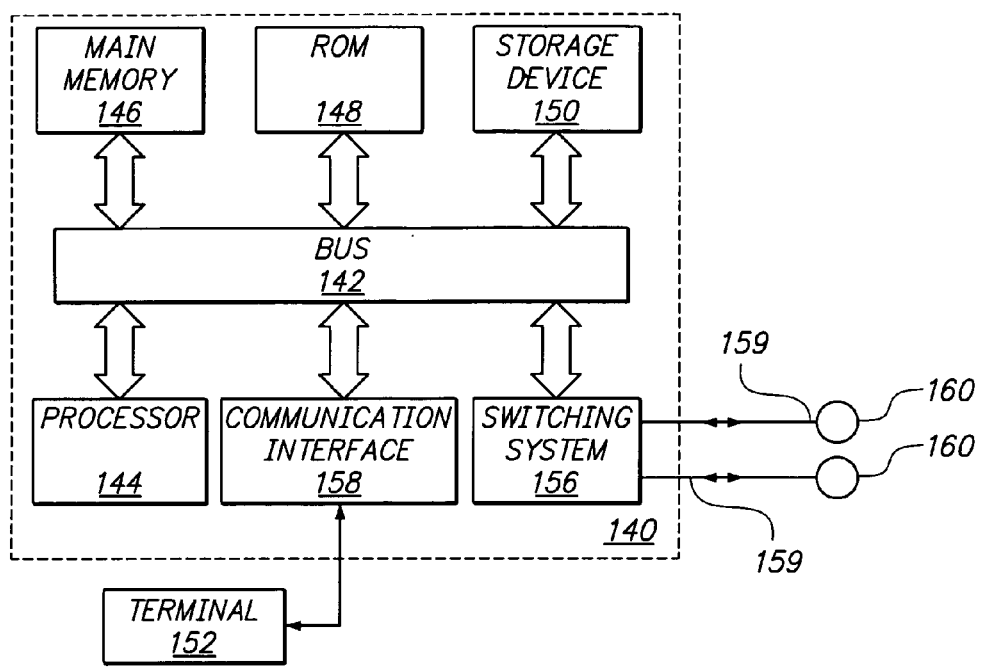
FIG. 8 is a block diagram that illustrates a computer system upon which a method for forwarding data may be implemented.

FIG. 8 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a forwarding node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

Processor 144 may execute the received code as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

It will be appreciated that any appropriate routing protocol can be used such as Intermediate System-Intermediate System (IS—IS) or Open Shortest Path First (OSPF) and in networks using any appropriate forwarding mechanism such as Internet Protocol (IP). Similarly any appropriate network can provide the platform for implementation of the method.

In addition the method can extend to any appropriate network change and any type of network for example a local area network (LAN).

Furthermore it will be appreciated that dependent on higher layer protocols, data may be divided up into multiple packets in view of maximum packet length requirements and so discussion in this document of packets refers to the individual packets or reassembled packets as appropriate. In the case of fragmented packets the R-bit is copied into all fragments.

What is claimed is:

1. A method of forwarding data in a data communications network comprising a plurality of nodes comprising the steps, performed at a forwarding node, of:
   implementing a forwarding strategy and forwarding data according to the forwarding strategy;
   encapsulating the data in a primary repair encapsulating packet if the implemented strategy comprises a repair strategy to compensate for a change in the network; and
   marking the primary repair encapsulating packet as repaired;
   further comprising the steps, where the repair strategy includes a multi-homed prefix repair strategy, of encapsulating a multi-homed prefix repair encapsulating packet in the primary repair encapsulating packet and marking the multi-homed prefix repair encapsulating packet as repaired.

2. A method as claimed in claim 1 in which the repair strategy is a secondary repair strategy.

3. A method as claimed in claim 2 further comprising the steps of encapsulating a secondary repair encapsulating packet in the primary repair encapsulating packet and marking the secondary repair encapsulating packet as repaired.

4. A method as claimed in claim 1 further comprising the step performed at the forwarding node of receiving a notification from another node in the network that the other node is also implementing a repair strategy and terminating the repair strategy upon receipt of the notification.

5. A method as claimed in claim 1 in which the step of marking the primary repair encapsulating packet as repaired comprises the step of introducing a decrementable counter.

6. A method as recited in claim 1, wherein the method further comprises the step of marking the forwarded data with a counter.

7. A method as claimed in claim 1, further comprising the steps, performed at a primary repairing node, of:
  identifying as a further repair node for a repair path to a target node a node from which a repair path is available towards the target node and
  establishing a primary repair path to the further repairing node as a repair path to the target.

8. A method as claimed in claim 7 in which the further repairing node is a neighbor node.

9. A method as claimed in claim 7 in which the step of identifying the further repairing node comprising the steps of computing at the primary repairing node a repair path available at least one other node in the network towards the target node.

10. A method as claimed in claim 9 in which the primary repairing node only computes repair path available at other nodes reachable by a repair path from the primary repairing node.

11. A method as claimed in claim 9 in which the primary node only computes repair paths at other nodes for target nodes not reachable by a primary repair path from the primary repairing node.

12. A method as claimed in claim 7 in which the step of identifying further repair nodes comprises the step of deriving further repair nodes from advertised repair path availability information from other nodes in the network.

13. A method as claimed in claim 7 in which a repair path around a component comprising a node or a link in the network is established by deriving a first set of nodes reachable from a repairing node without traversing the component, deriving a second set of nodes from which a target node is reachable without traversing the component and constructing a repair path from the repairing node to the target node via an intermediate node in the intersection of the first and second sets of nodes.

14. A method as claimed in claim 7 further comprising the step of forwarding data for the target node along the primary repair path to the further repairing node.

15. A method as claimed in claim 14 further comprising the step of encapsulating the data in an encapsulating packet destined for the further repairing node.

16. A method of forwarding data in a data communications network comprising a plurality of nodes comprising the steps, performed at a receiving node, of:
  receiving data in an encapsulating packet, wherein the encapsulating packet is received from a forwarding node that has implemented a forwarding strategy and has forwarded the data according to the forwarding strategy wherein the encapsulating packet is a primary repair encapsulating packet if the implemented strategy comprises a repair strategy to compensate for a change in the network, wherein the primary repair encapsulating packet is marked as repaired, wherein the repair strategy includes a multi-homed prefix repair strategy, wherein a multi-homed prefix repair encapsulating packet has been encapsulated in the primary repair encapsulating packet, wherein the multi-homed prefix repair encapsulating packet has been marked as repaired; and
  when a repair strategy is required as a forwarding strategy for the data to compensate for a change in the network, suppressing forwarding of the data if the data is marked repaired.

17. A method as claimed in claim 16 further comprising the steps, performed at the receiving node, of decapsulating the data and reviewing the decapsulated data to establish whether it is marked repaired.

18. A method as claimed in claim 16 further comprising the step, performed at the receiving node, of notifying a forwarding node identified as having marked the data repaired in the event that forwarding of data at the receiving node is suppressed.

19. A method as claimed in claim 16 further comprising the step, where the data is marked repaired with a decrementable counter, of implementing the repair strategy and decrementing the counter.

20. A method as claimed in claim 16 further comprising the steps, of identifying that the data is marked repaired with a decrementable counter, of suppressing forwarding of the data if the decrementable counter has reached a suppress value.

21. An apparatus 15 for forwarding data in a data communications network comprising a plurality of nodes, the apparatus comprising:
  means for implementing a forwarding strategy;
  means for forwarding data according to the forwarding strategy;
  wherein the implementing means is arranged to encapsulate the data in a primary repairing encapsulating packet if the implemented strategy comprises a repair strategy to compensate for a change in the network;
  means for marking the primary repair encapsulating packet as repaired; and
  means, where the repair strategy includes a multi-homed prefix repair strategy, for encapsulating a multi-homed prefix repair encapsulating packet in the primary repair encapsulating packet and means for marking the multi-homed prefix repair encapsulating packet as repaired.

22. An apparatus as claimed in claim 21 in which the repair strategy is a secondary repair strategy.

23. An apparatus as claimed in claim 22 further comprising means for encapsulating a secondary repair encapsulating packet in the primary repair encapsulating packet and means for marking the secondary repair encapsulating packet as repaired.

24. An apparatus as claimed in claim 21 further comprising means for receiving a notification from another node in the network that the other node is also implementing a repair strategy and means for terminating the repair strategy upon receipt of the notification.

25. An apparatus as claimed in claim 21 in which means for marking forwarded data as repaired comprises means for introducing a decrementable counter.

26. An apparatus as claimed in claim 21, further comprising:
  means for receiving data in an encapsulating packet and
  means, where a repair strategy is required as a forwarding strategy for the data to compensate for a change in the network, for suppressing forwarding of the data if the data is marked repaired.

27. An apparatus as claimed in claim 26 further comprising means for identifying that the data is marked repaired with a decrementable counter, and means for suppressing forwarding of the data if the decrementable counter has reached a suppress value.

28. An apparatus as claimed in claim 26 further comprising means for identifying that the data is marked repaired with a decrementable counter, means for implementing the repair strategy and means for decrementing the counter.

29. An apparatus as claimed in claim 26 further comprising means for decapsulating the data and means for reviewing the decapsulated data to establish whether it is marked repaired.

30. An apparatus as claimed in claim 26 further comprising means for notifying a forwarding node identified as having marked the data repaired in the event that forwarding of data at the receiving node is suppressed.

31. An apparatus as claimed in claim 21, the apparatus further comprising:
   means for implementing a forwarding strategy and forwarding data according to the forwarding strategy;
   wherein, where the implemented strategy comprises a repair strategy to compensate for a change in the network, the apparatus further comprises means for marking the forwarded data with a decrementable counter.

32. A computer readable medium comprising one or more sequences of instructions for forwarding data in a data communications network which, when executed by one or more processors, cause the one or more processors to perform the steps of the method of any of claims 2, 3, 1, 4, 5, 16, 17, 18, 19, 20, or 6.

33. An apparatus for forwarding data in a data communications network, the apparatus comprising:
   one or more processors;
   a network interface communicatively coupled to the processor and configured to communicate with one or more packet flows among the processor and network; and
   a computer readable medium comprising one or more sequences of instructions for forwarding data in a data communications network which when executed by one or more processors, causally one or more processors to perform the steps of the method of any of claims 2, 3, 1, 4, 16, 17, 18, 19, 20, or 6.

* * * * *

UNITED STATES PATENT AND TRADEMARK OFFICE
CERTIFICATE OF CORRECTION

PATENT NO. : 7,042,838 B1 Page 1 of 1
APPLICATION NO. : 10/848669
DATED : May 9, 2006
INVENTOR(S) : Ian Michael Charles Shand et al.

It is certified that error appears in the above-identified patent and that said Letters Patent is hereby corrected as shown below:

COLUMN 16
Claim 21: Line 19, delete "15".

COLUMN 18
Claim 33: Line 17, delete "1, 4, 16" and insert --1, 4, 6, 16--.

Signed and Sealed this

Nineteenth Day of June, 2007

JON W. DUDAS
*Director of the United States Patent and Trademark Office*